Figure 5:
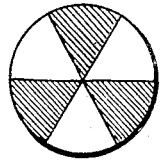

Jan. 11, 1955   K. RÄNTSCH   2,699,092
MICROSCOPE WITH AN ARRANGEMENT FOR
PRODUCTION OF IMAGE CONTRASTS
Filed Aug. 29, 1950   4 Sheets-Sheet 1

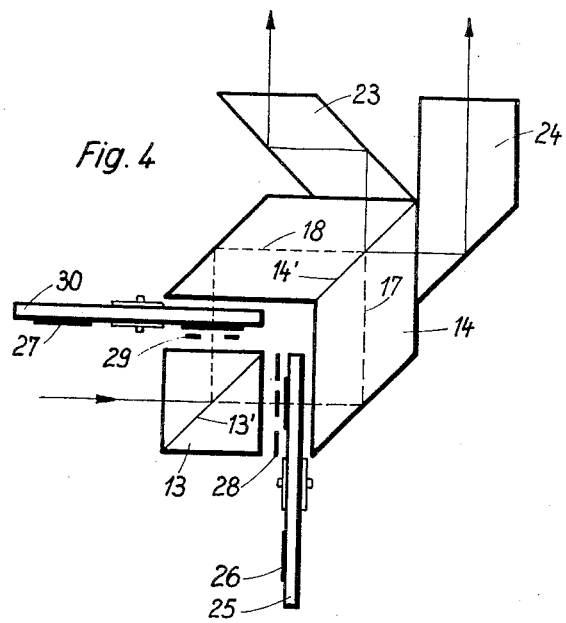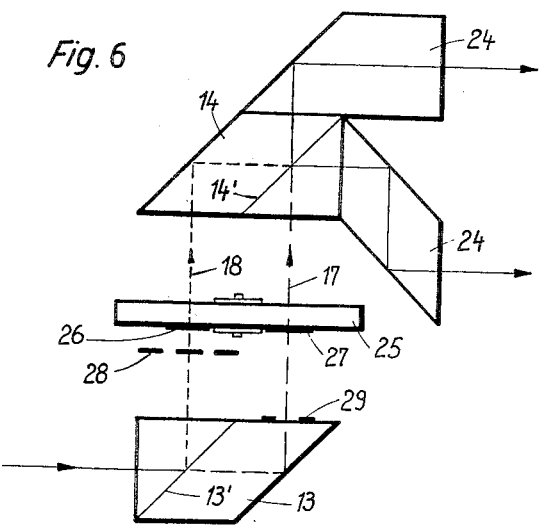

Jan. 11, 1955

K. RÄNTSCH 2,699,092

MICROSCOPE WITH AN ARRANGEMENT FOR
PRODUCTION OF IMAGE CONTRASTS

Filed Aug. 29, 1950

4 Sheets-Sheet 3

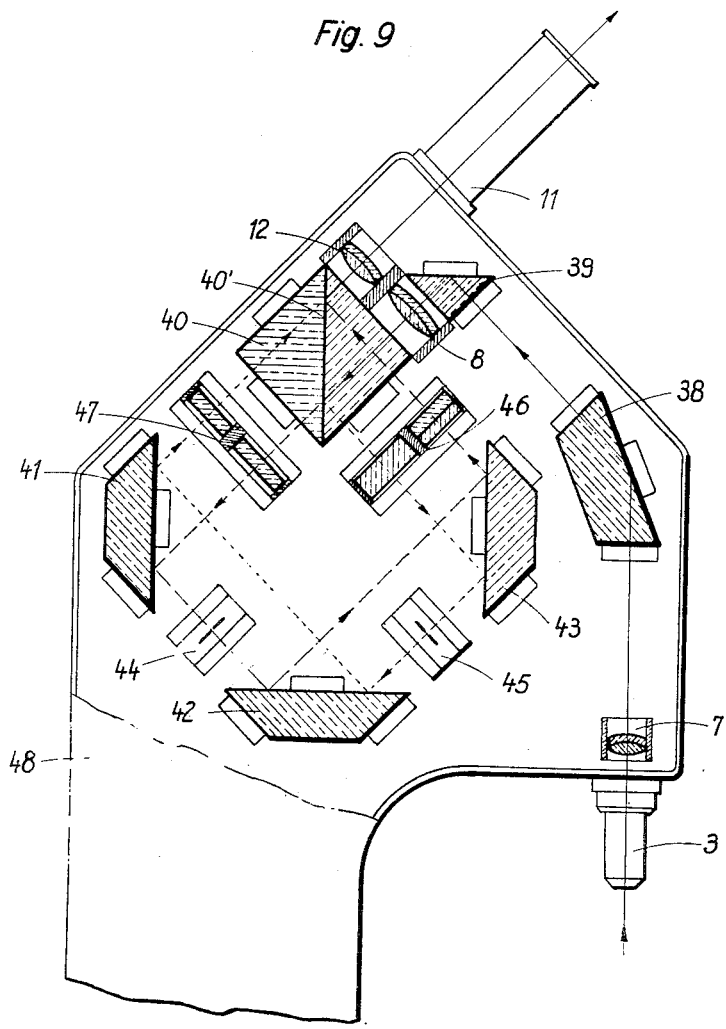

United States Patent Office 2,699,092
Patented Jan. 11, 1955

2,699,092

MICROSCOPE WITH AN ARRANGEMENT FOR PRODUCTION OF IMAGE CONTRASTS

Kurt Räntsch, Heidenheim on the Brenz, Germany, assignor to Carl Zeiss, Heidenheim (Brenz), Germany Application August 29, 1950, Serial No. 182,053

Claims priority, application Germany September 13, 1949

3 Claims. (Cl. 88—39)

It is known how to apply the so-called phase contrast procedure for achievement of contrasts in microscopic image formation. Hereby one sets out from the consideration that in the object, also at spots which indeed deviate from their surroundings in respect to the refractive index but not in respect to absorption, a light dispersion takes place, so that in the exit pupil of the objective there arise further diffraction images beside the direct image of the condenser diaphragm. By influencing the rays of the direct image over against those of the diffraction images there is thereby called forth such a superposition, thus e. g. an at least partial extinction, of the light coming from the concerned dispersion spot of the object, that this spot, i. e. the so-called phase inclusion, stands out in the image with corresponding contrasts against the surrounding field.

In practice now one has hitherto proceeded thus, that a so-called phase plate is placed in the exit pupil of the objective, which for one imparts a phase displacement to the light of the area conjugate to the diaphragm, i. e. the light of the direct diaphragm image, over against the light which passes through the remaining, so-called complementary area containing the diffraction images, and moreover possesses a different absorption in the conjugate area than in the complementary area. Hitherto one has practically always worked with phase plates of constant phase displacement of about λ/4 and constant absorption. A subsequent change of the phase or absorption conditions was not possible without more ado, since the phase plate was placed fast upon an outer or inner surface of the objective. Actually however the optimal conditions regarding absorption and under circumstances also regarding the phase displacement, change with the nature of the object. In order to achieve a greatest possible contrast it must thus be possible to adapt the absorption relation and if necessary, the phase displacement between the non-diffracted and the diffracted rays, to the object under consideration. However the application of such variable contrast means in the objective pupil of the familiar microscopes is impossible purely for reasons of construction, since such arrangements can never be so built that perchance an influencing solely of the rays of the one pupillary zone were possible, i. e. without influencing the other zone.

Besides the rigid phase plate is unfavorable also because the size of the area in the objective pupil conjugate to the diaphragm, is dependent upon the magnification of the objective used at the time, so that in change of objectives one must also carry out a change of the complete contrast arrangement. Naturally however the employment of a corresponding set of contrast objectives is expensive.

The invention concerns a contrast microscope, in which these difficulties are eliminated and whose range of application is considerably enlarged compared to the familiar contrast microscopes. Conformably to the invention, the microscope path of rays behind the objective is subdivided and the contrast arrangement placed in the one or in both partition paths of rays. This arrangement makes it possible to change at will corresponding to the optimal visibility conditions of the object, the phase or the illumination density of the rays of the direct diaphragm image and those of the diffraction images through different, also continuously variable contrast means, separately from one another, i. e. without direct influencing of the other paths of rays.

The subdivision of the path of rays itself can be under- taken in front of or in the objective pupil or in an intermediate image of this pupil. In the latter case an intermediate imaging system is suitably provided behind the objective, which produces a real image of the objective pupil. The reuniting of the partition paths of rays takes place suitably in front of or in the image plane of the ocular.

For ray partition, mirrors or reflecting prisms serve, which may be placed in the objective pupil or its intermediate image. The mirror in this case is adapted in its form to the conjugate area of the diaphragm or to the thereto complementary areas of the exit pupil.

In an especially preferred form of execution the splitting of the beam takes place by way of a semipermeable mirror, which is placed in the path of rays in front of the objective pupil or in front of its intermediate image, whereby diaphragms are provided at the place of the pupil or at the place of its intermediate image, which in their form preferably correspond to the image of the condenser diaphragm or to the area of the objective pupil complementary thereto.

The contrast arrangements placed in the one or in both partition paths of rays can consist of elements changing the phase, the amplitude, or the color of the light, or a combination of such elements. E. g. there can be provided in the partition paths of rays one or several revolving discs with graduated or with various contrast means.

In the phase contrast procedure, phase slides in the form of sliding glass wedges come into consideration as continuously variable contrast means. Ever according to the thickness of the cross section just located in the path of rays, a more or less great phase displacement is produced. In the absorption procedure, sliding double absorption wedges, or else polarization filters rotatable against one another, under circumstances in combination with a fixed phase plate, can find application, whereas for achievement of a color contrast in accordance with a further thought of the invention, complementary color filters, if necessary also in combination, with a phase plate, are placed in the two paths of rays. If hereby the rays of the nondiffracted image and of the diffraction images again unite, the image of the object detail appears in the surrounding field white, dark, or colored ever according to the amplitude of the two components. Further, a color contrast can be achieved also then, when one introduces between the two separated paths of rays a phase difference of more than λ/2. In this case various interference colors become visible ever according to the phase difference.

In order to assure in the phase contrast procedure the interference of the partition paths of rays at their point of reunion, the light paths from the separation point to the reunion point must be exactly equal. In accordance with a further thought of the invention this is achieved thereby that the divided path of rays proceeds with counterrunning ray conduction in a prism or mirror system. In such a system an identically equal light path is assured from the outset for both courses of rays, independent of the excellence of the adjustment of the prisms.

For a closer elucidation of the invention reference is made to the following description and the appended drawings, which besides show still further details of the invention.

Figure 2:
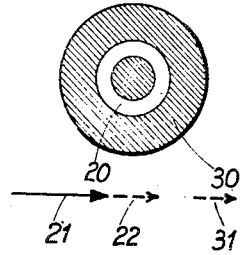
Figure 1:
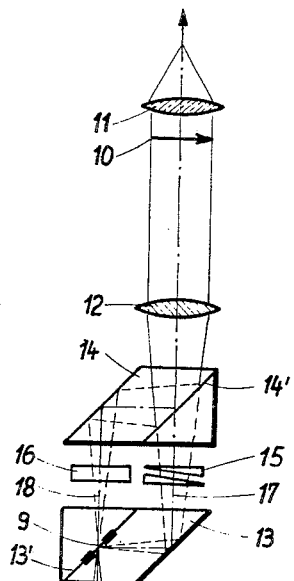
Figure 3:
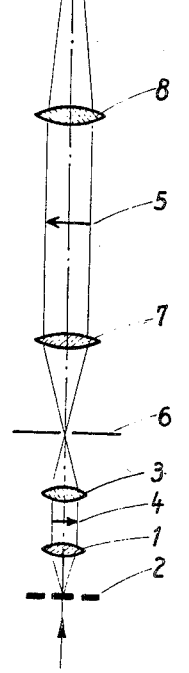

Fig. 1 shows schematically the course of the principal rays in a contrast microscope according to the invention. Fig. 2 serves for elucidating the path of the rays. Figs. 3 and 4 as well as 6 to 8 show essentially schematically the partition direction of rays in several execution examples. Fig. 5 shows an especially suitable diaphragm form, Fig. 9 finally shows the constructional arrangement of a contrast microscope in accordance with the invention, likewise essentially schematically and as an execution example.

In Fig. 1, 1 signifies the condenser of a contrast microscope with the condenser diaphragm 2 having a ring shaped transparent portion; 3 is the objective, which together with the condenser images the diaphragm 2 in the objective pupil 6. This in practice lies in the objective itself or at least in its immediate vicinity. In the present case therefore, a reversing system is provided, consisting of the two optical elements 7 and 8, which produces an intermediate image of the objective pupil in the location 13'. The image 5 of the preparation 4 produced by the objective is thereby likewise again imaged, namely by the lenses 8 and 12 in the location 10, where it can be observed with the ocular 11.

Behind the optical system 8 is arranged the beam splitting system, provided in accordance with the invention. It consists of the two prisms 13 and 14, which possess the cemented reflecting surfaces 13' and 14'. The reflecting surface at 13' lies in the present case at the location of the intermediate image of the objective pupil, and is adapted to the form of the condenser diaphragm having a reflecting ring shaped portion corresponding in its contours to the contours of said ring shaped transparent portion of the condenser diaphragm 2. It is brought to superposition with the direct image of the diaphragm, so that thus only the light of this direct image is deflected, whereas the rays taken up by the remaining part of the objective pupil, the so-called complementary area, pass through the cemented surface 13' undeflected. Across the mirror 14' these two partition paths of rays 17 and 18 are again united and interfere eventually at this place.

The fundamental mode of action of the contrast microscope can be explained about as follows: the imaging in the objective pupil of the ring shaped condenser diaphragm 2 takes place, as is known, without dispersion in the preparation 4 if the refractive index and also the absorption is the same at all places of the preparation. In the objective pupil or its intermediate image there arises thus a direct image 20 of the ring diaphragm, as represented in Fig. 2. The arrow 21 drawn in the illustration below the pupil shall be a measure of the light density of the image 20. If now one assumes the case of interest here, that the preparation 4 contains a microscopic inclusion whose refractive index deviates from that of its surrounding field, then a light dispersion sets in at the edges of this inclusion. The dispersion angle and the intensity distribution through this angle are dependent for one on the size of the inclusion and furthermore on the difference of the refractive index in contrast with that of the surrounding field. The light dispersed by the edges therefore reaches only in part the area of the objective pupil occupied by the direct diaphragm image 20, in part it is deflected into the area 30 complementary to it. The dispersed light therefore is subdivided; the part superimposing itself on the direct image 20 is represented by the arrow 22, the part passing through the pupil zone 30 by the arrow 31. If in the further course one allows these two parts of the beam to again, uninfluenced, act together, then they together again yield the same light density as it is originally present at each place of the preparation, and is illustrated by the arrow 21 of the radiation of the surrounding field. That means, the inclusion in the preparation would not stand out from its surrounding field in the image 10 of the preparation, assuming that the absorption of the dispersion spot is the same as that of the surrounding field. Only through the insertion of contrast means (absorption filter, phase plates, color filters) and corresponding influencing of the individual radiation components, illustrated by the arrows 21, 22, and 31, can it be achieved that in the image the phase inclusion stands out dark or light or colored from the surrounding field.

In the execution example according to Fig. 1 therefore, the path of rays 17 reflected at the reflecting ring shaped portion of the mirror 13' contains the radiation components corresponding to the two arrows 21 and 22 of Fig. 2, whereas the partition path of rays 18 consists of the component 31. Owing to the spatial separation of the two partition paths of rays, these can easily be influenced separately one from another. For the purpose, in Fig. 1, a sliding phase wedge 15, if necessary with absorption effect, is placed into the path of rays 17 of the direct image. The plane parallel plate 16 in the other path of rays 18 serves solely for compensating the thickness of the wedge 15. By means of the wedge now e. g. the phase and the absorption of components 21 and 22 can be so changed in contrast to component 31, that e. g. the components 22 and 31 through interference at mirror 14' ever according to the ratio of their intensities more or less extinguish themselves. Then the phase inclusion in the preparation appears dark against the surrounding field.

In place of the phase wedge also an absorption arrangement can be used under circumstances, thus e. g. a gray wedge. If the gray wedge is placed perhaps in ray path 18, then it diminishes here the light density, therefore the component 31. In reuniting this component 31 and 22 their total intensity is accordingly diminished in comparison to the component 21, i. e. in comparison to the surrounding field radiation and the dispersing spot likewise again appears dark in a bright surrounding field. On the other hand by placing the absorption wedge into the ray path 17, one can obtain light contrasts in a dark surrounding field. In certain cases the gray wedge can also be combined with a phase plate of fixed phase displacement e. g. of $\lambda/4$.

Ever according to the desired contrast effect (dark contrast in light field or vice versa) these contrast means are placed into the ray path 17 or into the ray path 18 or however distributed in suitable manner to both.

An especially suitable absorption arrangement, which also can be used in combination with a fixed phase plate, consists of polarization filters, of which the one is placed in the partition path of rays 17 and the other behind the prism 14, thus e. g. in the ocular. Through rotation of one of the polarization filters results a more or less strong extinction of the partition path of rays, and thereby different degrees of the contrast in brightness can be adjusted. Frequently it can be expedient to provide supplementarily for this polarization arrangement in the ray of path 18 also an absorption filter, whereby the various degrees of the contrast in darkness can also be produced. Particularly advantageous is a polarization arrangement in which there is provided in both paths of rays polarization filters with planes of vibration perpendicular to one another, and in the ocular a rotatable analyser. Through activation then of the analyser the total degrees of contrast from light to dark contrast can be traversed and the degrees most suitable for the particular preparations adjusted.

Finally the production of color contrasts is likewise readily possible with the microscope developed in accordance with the invention. For this purpose one can again insert into one of the two ray paths 17 or 18, a wedge or a suitable phase plate, which effects a phase displacement of more than $\lambda/2$. With white light colored interferences result with such a phase displacement, so that in the present instance the contrast images likewise appear colored, that is the appropriate color can be selected by suitable adjustment of the phase wedge. In using white light with the center of gravity at a wave length of $\lambda \approx 555$ m$\mu$ one obtains e. g. yellow interferences with a phase displacement of about $1.5 \times \lambda/2$, red with a displacement of about $2 \times \lambda/2$, and blue finally with a displacement of about $2.5 \times \lambda/2$. Besides, color contrasts can be obtained especially suitably thereby that one places in the two partition paths of rays 17 and 18 complementary color filters, e. g. green in ray path 17 and red in ray path 18, under circumstances combined with a fixed phase plate and eventually an absorption arrangement. In the reuniting of the two pencils of rays at the mirror 14' the two components of the dispersed radiation (designated in Fig. 2 by the arrows 22 and 31), under the assumption that they possess about equal intensity, would then again yield essentially white light, so that the corresponding phase inclusion thus stands out white in the image against a here green surrounding field, which is represented by the radiation component 21. If on the other hand one places supplementarily an absorption filter into the ray path 17, then the contrast spot appears colored, namely in the color of the filter placed into ray path 18 (here red), since then indeed the component 22 (Fig. 2) is under circumstances greatly reduced. The surrounding field on the other hand appears more or less green.

The color contrast has the advantage, that it in opposition to the customary light or dark contrast permits an unequivocal distinction whether the contrast originates in preparation places of different refractive index or different absorption. The contrast places of different absorption are always dark, also in application of the color contrast procedure, while the contrasts depending upon different refractive index appear white or colored.

Fig. 3 shows another execution of a beam splitting system, as it can be used with a microscope according to Fig. 1. The path of rays is drawn in; the arrow tips point in direction of the ocular. The ring-shaped mirror surface 13' of the prism 13 having a ring shaped reflecting surface lies, as in the execution according to Fig. 1, at the location of the intermediate image of the objective pupil. The reuniting of the partition paths of rays takes place at the partially permeable metallized cemented surface 14' of the prism 14. In order to utilize the light as completely as possible, two further prisms 23 and 24 are here provided, which permit a binocular observation of the image. A revolving disc 25 is placed between the two prisms 13 and 14, which at 26 and 27 carries the contrast means in the form of phase discs, gray filters, or color filters. By turning of the revolving disc one can introduce any contrast means, also in suitable combination, into the two ray paths 17 and 18 and thereby influence the light so, that after reuniting the rays at 14', corresponding image contrasts arise. The ring-shaped mirror surface 13' again is adapted in its contours to the image of the ring diaphragm 2 in the condenser. To avoid exchanging this mirror with use of objectives of different magnification, in accordance with a further thought of the invention, a series of exchangeable objectives is employed, in which the ratio of aperture to imaging scale is constant. Then only an exchange of the condenser diaphragm itself suffices in a change of objectives. A change in the contrast arrangement on the other hand is not required. The use of such an objective series of course is not restricted to the execution example according to Fig. 3, but has the same importance in all contrast microscopes, in which one wants to avoid the exchange of the mirror, a diaphragm, or the contrast plate itself in the intermediate image of the objective pupil.

In Fig. 4 is represented a further execution form of the beam splitting system, a modification of Fig. 3, namely here the division takes place in prism 13 in front of the image of the objective pupil. The cemented surface 13' is throughout silvered partly permeable, so that the beam is divided altogether and not according to zones. The intermediate image of the objective pupil lies farther back at the location of the diaphragms 28 and 29. The diaphragm 29 is so constructed that it screens off the direct image and allows only the rays of the complementary area (30 in Fig. 2) to pass, while the diaphragm 28 just reversed allows only the direct image (20 in Fig. 2) to pass, on the other hand intercepts the rays of the complementary area. For inserting the contrast means revolving discs 25 and 30 in the two partition paths of rays 17 and 18 are provided. Thus the contrast means 26 and 27 can also here again be selected independent from one another and adapted to the most favorable contrast conditions. Instead of the revolving discs, continuously changeable contrast means, as described at hand of Fig. 1, can also be employed. The two prisms 23 and 24 again permit a binocular observation. The arrangement shown in Fig. 4, in which the intermediate image of the objective pupil is freely accessible in the partition paths of rays, has for one the advantage that the adjustment of the diaphragms in reference to the direct condenser image, is simpler. As is known, the image of the ring shaped portion of the condenser diaphragm 2 must coincide in its contours very precisely with the partially reflecting ring shaped portion of mirror 13' in Fig. 1 and Fig. 3, or correspondingly with the diaphragms 28 and 29 in Fig. 4. Further, the free position of the objective pupil in the partition paths of rays has the advantage that the diaphragms 28 and 29 themselves can be exchanged without more ado, which can be necessary with exchangeable objectives because of the change in magnification, in order to again obtain an unobjectionable covering of the condenser image with the diaphragms 28 and 29. Finally however it can generally be expedient in definite cases to also install diaphragms of basically other form. E. g. in many cases a sector diaphragm as represented in Fig. 5, is advantageous. Diaphragms of this sort complementary to one another are inserted into the two partition paths of rays. The sector diaphragm has the advantage that its openings can be changed, in that one turns two sector diaphragms against one another. Such adjustable sector diaphragms can then be provided in the condenser and at the places 28 and 29, where lies the intermediate image of the objective pupil. The condenser diaphragm can supplementarily also be arranged rotatable about its axis. Through the possibilities of variation one can at all times adjust the most favorable diaphragm size for optimal contrast, as well as its most favorable image position in reference to the contrast plate. An especially advantageous construction results if the sector diaphragm (under circumstances not adjustable) is combined with an iris diaphragm in the condenser. Through this an aperture change of the condenser diaphragm becomes possible and one can e. g. select a small aperture when phase inclusions of greater extension in the preparation shall appear rich in contrast. With inclusions of small extension on the other hand one will preferably select a largest possible aperture, which is favorable in regard to the resolving power.

Frequently it can also be expedient to place into the one beam a simple round diaphragm which leaves free the entire objective pupil, and only in the other partition path of rays either diaphragm out solely the image of the condenser diaphragm or the area of the objective pupil conjugate thereto. Through influencing of the partition paths of rays by means of contrast arrangements, special contrast effects result here also.

Fig. 6 shows a further execution example of a beam splitting arrangement for the contrast microscope developed in accordance with the invention. The ray division at the partially permeable metallized cemented surface 13', again is undertaken in front of the intermediate image of the objective pupil, which itself lies at the place of the diaphragms 28 and 29. For the rest the basic mode of operation of the arrangement is similar to that elucidated at hand of Fig. 4.

Figure 7:
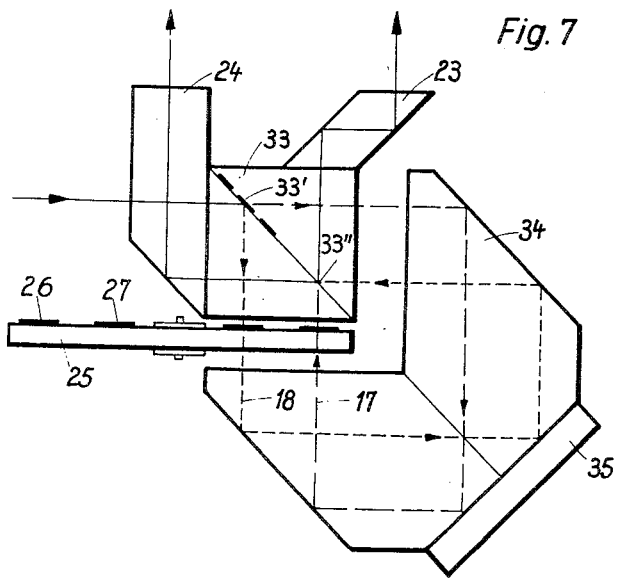

The beam splitting arrangement represented in Fig. 7 is particularly advantageous for contrast microscopes in which with consideration of the phase displacement between the partition paths of rays 17 and 18, the light path of both beams from their dividing point to their reuniting point must be equalized with greatest possible precision. In the execution form according to Fig. 7, this is attained through a prism system, in which the two partition paths of rays traverse in reverse direction precisely the same prisms and the same distances. The splitting of the beam and also the reuniting takes place in the cube prism 33, whose cemented surface is metallized. On its one half 33', upon which the arriving ray falls, a complete metallization is provided at the place of the intermediate pupil, in the form of the imagined ring shaped condenser diaphragm, and indeed in such fashion that the direct image of the condenser diaphragm passes through the cemented surface uninfluenced, while the rays of the area of the objective pupil complementary thereto, are deflected. Both partition paths of rays 17 and 18 then, running oppositely, pass over into the prism 34 with the mirror 35, and unite again in the lower part of the cemented surface 33'', which at this place is metallized only semipermeable. The image again can be observed binocularly over the prisms 23 and 24. The contrast means 26 and 27, thus e. g. phase plates or gray filters, can be placed into the two partition paths of rays 17 and 18 with aid of the revolving disc 25. The represented arrangement has the advantage, that essentially independently of the excellence of the workmanship, precisely equal path distances are assured for the two partition paths of rays.

Figure 8:
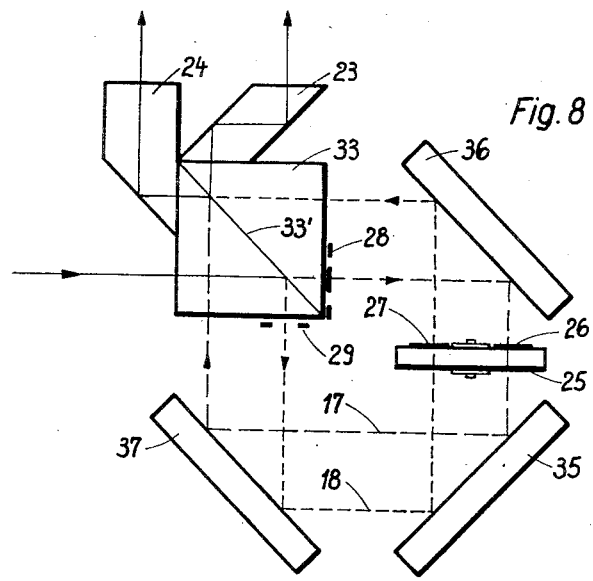

Fig. 8 shows a similar construction form as Fig. 7, however the prism 34 is replaced by the mirrors 35 to 37. Besides the beam splitting takes place in prism 33 in front of the intermediate image, which again, as in the previous execution forms, lies at the place of the diaphragms 28 and 29. The cemented surface 33' of the prism 33 is metallized throughout partially permeable, whereby the manufacture is simplified. For the rest the path of rays appears directly from the drawing. The contrast means 26 and 27 for both partition paths of rays 17 and 18 are arranged, capable of being cut out, at 25 with aid of a revolving disc. Instead of these, of course, also other continuously variable contrast means, such as phase wedges or absorption wedges, can find application.

The arrangement represented in Fig. 9 shows, in part schematically, how the beam splitting arrangement according to the invention can for example be mounted in a microscope housing. The housing sits upon a foot 48, represented broken, to which also the other not shown parts, such a stage, condenser and condenser diaphragm, can be attached in the as such customary manner. Departing from the object, the light enters through the objective 3. The light ray passes from the objective through the first element 7 of the intermediate imaging system, across the reflecting prisms 38 and 39 and the second optical element 8 to the beam splitting prism 40. The cemented surface 40' of this prism is metallized partially permeable. The beam splitting takes place in the lower part of this surface. The one ray proceeds across the reflecting prisms 41, 42, 43 again back upon the upper part of the cemented surface 40', where it again unites with the other partition ray. This second partition ray proceeds out from the splitting place in reversed direction as the first partition ray, across the reflecting prisms 43, 42, and 41. The arrangement thus corresponds in principle to that represented in Fig. 8. From the splitting prism the light ray then enters into the ocular 11 across the field lens 12. At the place of the intermediate image of the objective pupil are placed in the partition paths of rays, the diaphragms 44 and 45, which, as discussed at hand of the preceding illustrations, are complementary to one another and therewith effect a separation of the light of the direct image of the condenser diaphragm from that of the diffration images. The contrast means e. g. phase wedges, are placed in the partition paths of rays at 46. Supplementary contrast means, perhaps absorption filters, can be provided in another place at 47. The arrangement represents solely an execution example, which can be modified ever in accordance with the desired purpose.

I claim:

1. In a contrast microscope having a light control system cooperating with the optical system of said microscope including at least a condenser, an objective, a reversing lens system and an eyepiece, all said elements suitably aligned along an optical axis thereof, said light control system being adapted to provide gradual changes of phase and amplitude of deviated and undeviated spectra emanating from a specimen and including a diaphragm positioned substantially at the entrance pupil of said microscope system adjacent said condenser having aperture means predeterminedly formed therein for admitting light of predetermined contour to said microscope system, light dividing means including a semitransparent layer for partly transmitting and partly reflecting said imaging rays into two bundles located in the path of rays at a position between said reversing system and an intermediate image plane of the exit pupil of said microscope system, further diaphragm means located in both said divided bundles exactly at the position of said intermediate image plane, said further diaphragm means being both related in their contours to the contours of said condenser diaphragm such as to intercept the light rays of said deviated spectra and to transmit the light rays of said undeviated spectra in the one said divided bundle and vice versa in the other said divided bundle, and means in both said bundles for individually and separately controlling said deviated and undeviated spectra as to phase and amplitude in either said bundles transmitted by said further diaphragm means, and means for subsequently recombining said individually controlled spectra such as to obtain gradual alteration of contrast in an image of the specimen to be observed in the ocular image plane.

2. In a contrast microscope according to claim 1 said diaphragm means located in both said divided bundles and said means for individually and separately controlling being located exchangeably in the light paths of both said divided bundles.

3. In a contrast microscope according to claim 1, said light dividing means and said recombining means comprising each a semitransparent layer, both said layers lying in one and the same plane adjacent one another, and reflecting means located between the two opposite sides of said dividing and recombining layer plane for conducting the said reflected and transmitted imaging ray bundles in opposite directions from said dividing layer side to said recombining layer side.

References Cited in the file of this patent

UNITED STATES PATENTS

| | | |
|---|---|---|
| 2,045,124 | Cummins et al. | June 23, 1936 |
| 2,516,905 | Osterberg et al. | Aug. 1, 1950 |